United States Patent
Xia et al.

(10) Patent No.: US 12,308,995 B2
(45) Date of Patent: May 20, 2025

(54) INTEGRATED CIRCUIT CHIP FOR TRANSPORTATION VEHICLE

(71) Applicant: Huawei Technologies Co., Ltd., Shenzhen (CN)

(72) Inventors: Jing Xia, Shenzhen (CN); Nan Duan, Shenzhen (CN); Chunxiao Cai, Shenzhen (CN); Hengchao Xin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/510,972

(22) Filed: Nov. 16, 2023

(65) Prior Publication Data

US 2024/0089143 A1    Mar. 14, 2024

Related U.S. Application Data

(63) Continuation of application No. PCT/CN2021/094166, filed on May 17, 2021.

(51) Int. Cl.
*H04L 12/40* (2006.01)

(52) U.S. Cl.
CPC .... *H04L 12/40* (2013.01); *H04L 2012/40273* (2013.01)

(58) Field of Classification Search
CPC ............. H04L 12/40; H04L 2012/40273
See application file for complete search history.

(56) References Cited

U.S. PATENT DOCUMENTS

| | | | | |
|---|---|---|---|---|
| 7,280,412 | B2* | 10/2007 | Jang | G11C 7/1069 326/26 |
| 2003/0169073 | A1* | 9/2003 | Takiba | G06F 13/4027 326/86 |
| 2014/0288786 | A1 | 9/2014 | Mayser et al. | |
| 2015/0006778 | A1 | 1/2015 | Leo et al. | |
| 2017/0222790 | A1* | 8/2017 | Hooper | H04H 60/00 |
| 2018/0319235 | A1* | 11/2018 | Wittenschlaeger | B60G 17/06 |
| 2019/0131974 | A1 | 5/2019 | Das Sharma | |

FOREIGN PATENT DOCUMENTS

EP    3651418 A1    5/2020

OTHER PUBLICATIONS

ISO 26262: Functional Safety Standard for Modern Road Vehicles, ROHM semiconductor, Apr. 22, 2020, total 15 pages.

* cited by examiner

*Primary Examiner* — Henry Tsai
*Assistant Examiner* — John B Roche
(74) *Attorney, Agent, or Firm* — Slater Matsil, LLP

(57) ABSTRACT

This disclosure relates to a chip, an electronic device, a transportation vehicle, and a method for generating a control signal. The chip includes a mesh bus and a ring bus. The mesh bus is coupled to each sensor to receive and transmit perception data. The ring bus is coupled to a processor and the mesh bus. The processor receives different types of perception data from different sensors such as a camera and a lidar, and fuses the data to generate a control signal for controlling an execution apparatus.

19 Claims, 4 Drawing Sheets

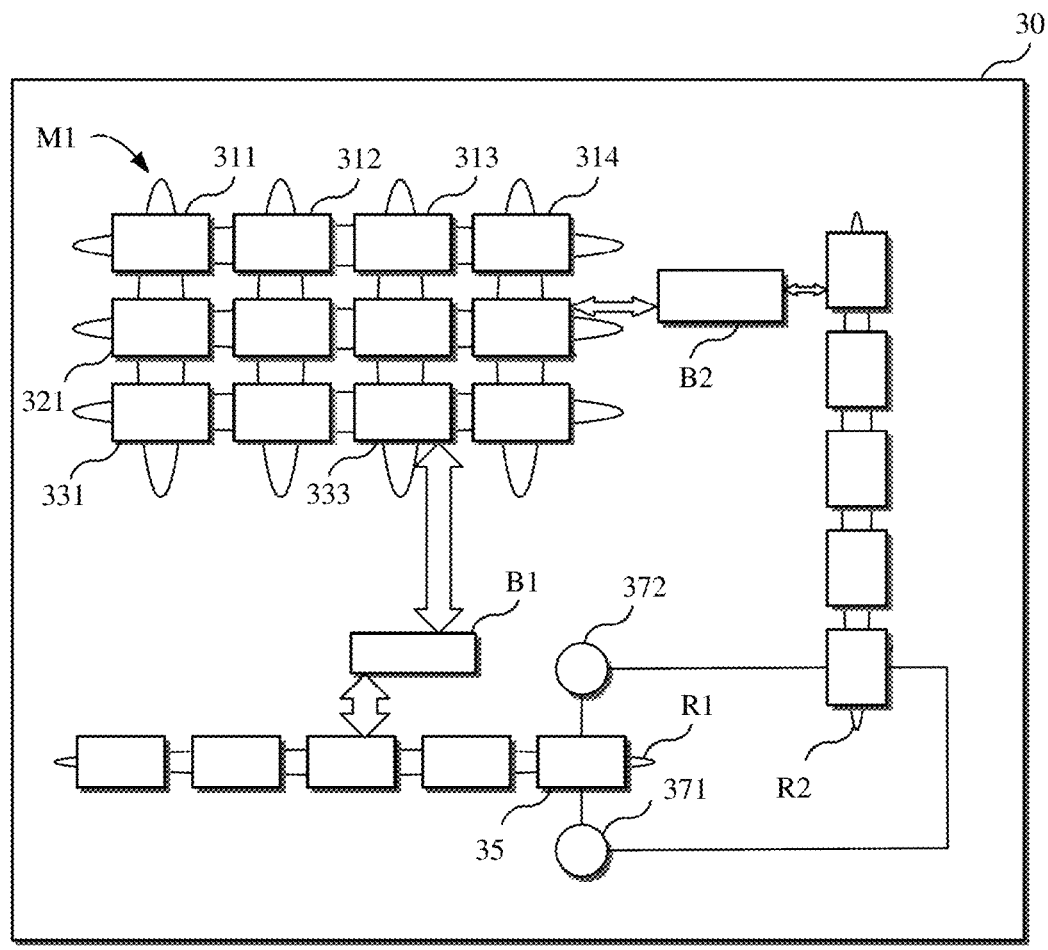
FIG. 3 (AMENDED)

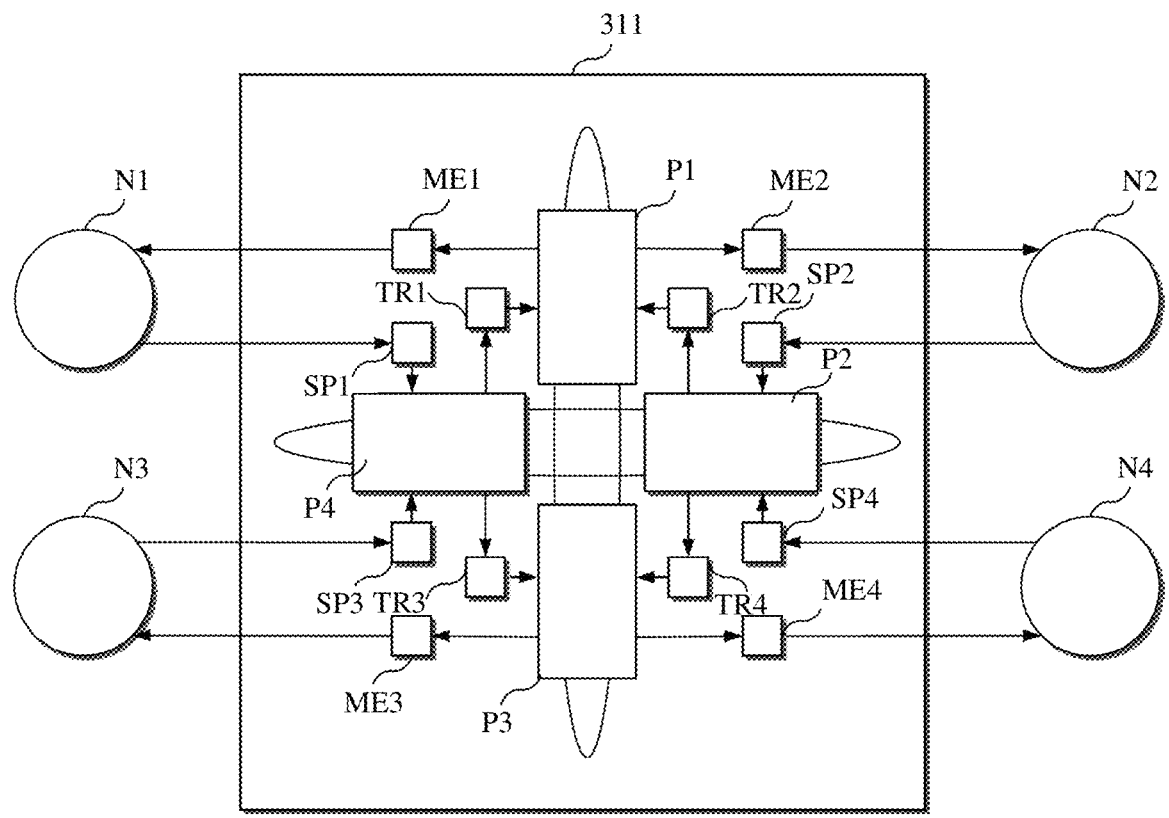
FIG. 5 (AMENDED)

INTEGRATED CIRCUIT CHIP FOR TRANSPORTATION VEHICLE

CROSS-REFERENCE TO RELATED APPLICATIONS

This application is a continuation of International Application No. PCT/CN2021/094166, filed on May 17, 2021, the disclosure of which is hereby incorporated by reference in its entirety.

TECHNICAL FIELD

This disclosure relates to the electronics field, and more specifically, to an integrated circuit chip and an electronic device that are for a transportation vehicle.

BACKGROUND

With development of information technologies, more intelligent transportation vehicles such as intelligent automobiles emerge. For an intelligent transportation vehicle, functions such as autonomous driving, voice interaction, and driver monitoring become core competencies of the intelligent transportation vehicle. Implementation of these functions usually depends on corresponding hardware, such as a vehicle-mounted chip, a camera, a light detection and ranging (LiDAR), a sonar, a radar, and a microphone.

In addition, the autonomous driving is directly related to personal safety. Therefore, safety of a chip for implementing autonomous driving is particularly concerned. In some conventional autonomous driving solutions, a dual-chip redundancy design is used to improve safety specifications. However, the dual-chip design solution usually costs high and consumes many resources.

SUMMARY

In view of the foregoing problems, embodiments of this disclosure are intended to provide a chip, an electronic device, a transportation vehicle, and a method for generating a control signal, to achieve transportation vehicle control with low costs.

According to a first aspect of this disclosure, a chip is provided. The chip includes a first bus, a second bus, and a processor. The first bus is configured to transmit first perception data. The second bus is coupled to the first bus. A type of the second bus and a type of the first bus are different. The second bus is configured to transmit second perception data and the first perception data that is from the first bus. A type of the second perception data and a type of the first perception data are different. The processor is coupled to the second bus, and the processor is configured to generate, based on the first perception data and the second perception data, a control signal for controlling an execution apparatus. Since functional circuits are respectively coupled to different buses based on function types (for example, sensing and decision-making), perception data may be transmitted on the first bus, and decision data may be transmitted on the second bus. In this way, advantages of each bus may be effectively utilized, such as a low delay and efficient data transmission of a ring bus, and high scalability, high bandwidth, and a low delay of a mesh bus, so that resource consumption and a delay are reduced.

In an implementation, the first bus is selected from a group including the mesh bus, a full-mesh bus, and a star bus. The second bus is selected from a group including a ring bus, a linear bus, and a tree bus.

In an implementation, the chip further includes a first processing circuit. The first processing circuit is coupled to the first bus, and receives first sensed data from a first sensor coupled to the first bus. The first processing circuit processes the first sensed data to generate the first perception data. Since sensed data is locally processed, a large amount of original sensed data can be prevented from being transmitted, thereby reducing bandwidth and costs.

In an implementation, the first processing circuit is selected from a group including an artificial intelligence vector circuit and an artificial intelligence core circuit. The first sensor is selected from a group including a camera, a LiDAR, a sonar, and a radar.

In an implementation, the chip further includes a third bus. The third bus is coupled to the first bus. A type of the third bus and the type of the second bus are the same. The third bus is configured to transmit first auxiliary data that is corresponding to the first perception data and that is from the first bus and second auxiliary data corresponding to the second perception data. The processor is coupled to the third bus, and the processor is further configured to generate the control signal based on the first perception data, the first auxiliary data, the second perception data, and the second auxiliary data. The auxiliary data is transmitted through the third bus of the same type as the second bus, so that integrity or validity of the perception data transmitted on the second bus can be verified, to improve safety of data transmission and improve safety performance of the chip.

In an implementation, the auxiliary data includes cyclic redundancy check data. In an implementation, the chip further includes a second processing circuit. The second processing circuit is coupled to the first bus or the second bus, and receives second sensed data from a second sensor coupled to the first bus or the second bus. The second processing circuit processes the second sensed data, to generate the second perception data. Since the sensed data is locally processed, the large amount of original sensed data can be prevented from being transmitted, thereby reducing the bandwidth and the costs.

In an implementation, the second processing circuit is selected from the group including the artificial intelligence vector circuit and the artificial intelligence core circuit. The second sensor is selected from the group including the camera, the LiDAR, the sonar, and the radar.

In an implementation, the processor is further configured to determine, based on the first perception data and the first auxiliary data, first environment data indicating an environment condition; determine, based on the second perception data and the second auxiliary data, second environment data indicating an environment condition; and generate the control signal based on the first environment data and the second environment data. Validity of environment data may be mutually verified through interaction based on different types of environment data. For example, if the first environment data indicates that there is a pedestrian on a road ahead, and the second environment data of a different type also indicates that there is a pedestrian on the road ahead, a corresponding control signal may be generated based on the consistent result.

In an implementation, the processor is further configured to fuse the first environment data and the second environment data, to generate fused data; and generate the control signal based on the fused data. In an implementation, the processor is further configured to fuse the first perception data and the second perception data, to generate fused data, and generate the control signal based on the fused data. Since different types of perception data such as camera data and LiDAR data are fused, validity of the perception data can be verified, a sensed correct environment object is ensured, and a corresponding decision or control signal is generated, so that the execution apparatus such as an actuator of a transportation vehicle can perform a corresponding correct operation. In this way, a safety level of the transportation vehicle may be increased.

In an implementation, the chip further includes: a first cross station circuit, located on the first bus and configured to transmit data; and a first processing circuit, coupled to the first cross station circuit and configured to generate the first perception data based on the first sensed data that is from the first sensor, where the first sensor is coupled to the first cross station circuit. Since a sensor and a processing circuit are coupled to a same cross station circuit, a large amount of sensed data can be prevented from being transmitted over a long distance on the first bus, to reduce bandwidth congestion and improve a processing speed.

In an implementation, the chip further includes: a second cross station circuit, located on the second bus and configured to transmit data; and a second processing circuit, coupled to the second cross station circuit and configured to generate the second perception data based on the second sensed data that is from the second sensor, where the second sensor is coupled to the second cross station circuit. Since the sensor and the processing circuit are coupled to the same cross station circuit, the large amount of sensed data can be prevented from being transmitted over a long distance on the second bus, to reduce the bandwidth congestion and improve the processing speed.

In an implementation, the first bus includes the mesh bus, the second bus includes the ring bus, and the third bus includes the ring bus.

According to a second aspect of this disclosure, an electronic device is provided. The electronic device includes a circuit board and the chip according to the first aspect. The chip is mounted on the circuit board. Since functional circuits on the chip are respectively coupled to different buses based on function types (for example, sensing and decision-making), perception data may be transmitted on the first bus, and decision data may be transmitted on the second bus. In this way, advantages of each bus may be effectively utilized, such as a low delay and efficient data transmission of the ring bus, and high scalability, high bandwidth, and a low delay of the mesh bus, so that resource consumption and a delay are reduced.

According to a third aspect of this disclosure, a transportation vehicle is provided. The transportation vehicle includes a power supply and the electronic device according to the second aspect. The electronic device is powered by the power supply. Since functional circuits on the chip in the transportation vehicle are respectively coupled to different buses based on function types (for example, sensing and decision-making), perception data may be transmitted on the first bus, and decision data may be transmitted on the second bus. In this way, advantages of each bus may be effectively utilized, such as a low delay and efficient data transmission of the ring bus, and high scalability, high bandwidth, and a low delay of the mesh bus, so that resource consumption and a delay are reduced.

In an implementation, the transportation vehicle further includes a first sensor and a second sensor. The first sensor is coupled to a first bus through a first interface, and is configured to generate first sensor data and transmit the first sensor data to the first bus. The second sensor is coupled to a second bus through a second interface, and is configured to generate second sensor data and transmit the second sensor data to the second bus.

According to a fourth aspect of the disclosure, a method for generating a control signal is provided. The method includes: transmitting first perception data through a first bus; transmitting, through a second bus, second perception data and the first perception data that is from the first bus, where a type of the second bus and a type of the first bus are different, and a type of the second perception data and a type of the first perception data are different; and generating, based on the first perception data and the second perception data that are obtained from the second bus, a control signal for controlling an execution apparatus. Since functional circuits on the chip are respectively coupled to different buses based on function types (for example, sensing and decision-making), perception data may be transmitted on the first bus, and decision data may be transmitted on the second bus. In this way, advantages of each bus may be effectively utilized, such as a low delay and efficient data transmission of the ring bus, and high scalability, high bandwidth, and a low delay of the mesh bus, so that resource consumption and a delay are reduced.

In an implementation, the method further includes: transmitting, through a third bus, first auxiliary data that is corresponding to the first perception data and that is from the first bus and second auxiliary data corresponding to the second perception data, where the third bus is coupled to the first bus, and a type of the third bus and the type of the second bus are the same; and generating the control signal based on the first perception data, the first auxiliary data, the second perception data, and the second auxiliary data. Auxiliary data is transmitted through the third bus of the same type as the second bus, so that integrity or validity of the perception data transmitted on the second bus can be verified, to improve safety of data transmission and improve safety performance of the chip.

In an implementation, the generating, based on the first perception data and the second perception data that are obtained from the second bus, a control signal for controlling an execution apparatus includes: determining, based on the first perception data and the first auxiliary data, first environment data indicating an environment condition; determining, based on the second perception data and the second auxiliary data, second environment data indicating the environment condition; and generating the control signal based on the first environment data and the second environment data. Validity of environment data may be mutually verified through interaction based on different types of environment data. For example, if the first environment data indicates that there is a pedestrian on a road ahead, and the second environment data of a different type also indicates that there is a pedestrian on the road ahead, a corresponding control signal may be generated based on the consistent result.

In an implementation, the generating the control signal based on the first environment data and the second environment data includes: fusing the first environment data and the second environment data, to generate fused data; and generating the control signal based on the fused data. Validity of environment data may be mutually verified through interaction based on different types of environment data. For example, if the first environment data indicates that there is a pedestrian on a road ahead, and the second environment data of a different type also indicates that there is a pedestrian on the road ahead, a corresponding control signal may be generated based on the consistent result.

It may be understood that content described in the summary is not intended to limit the key or important features of embodiments of this disclosure, nor to limit the scope of this disclosure. Other features of this disclosure may be readily understood from the following descriptions.

BRIEF DESCRIPTION OF DRAWINGS

The foregoing and other features, advantages, and aspects of embodiments of this disclosure become clearer in conjunction with the accompanying drawings and with reference to the following detailed descriptions. In the accompanying drawings, the same or similar reference numerals indicate the same or similar elements.

FIG. 3 is a schematic diagram of a chip according to some embodiments of this disclosure;

FIG. 5 is a schematic diagram of a mesh bus cross station according to some embodiments of this disclosure;

DESCRIPTION OF EMBODIMENTS

Figure 1:
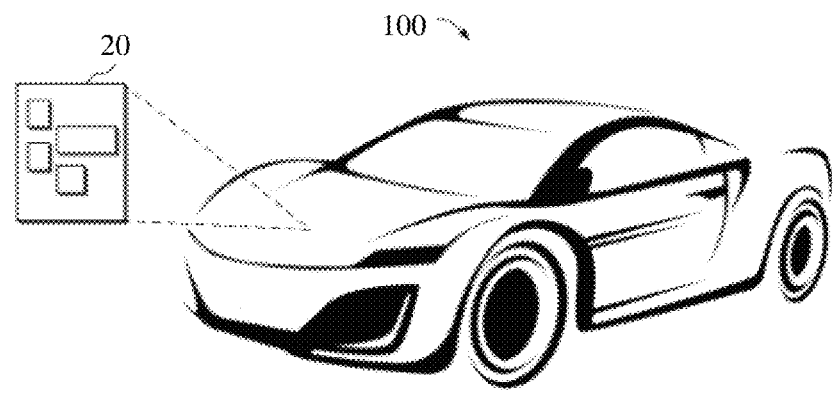
FIG. 1 is a schematic diagram of an environment according to some embodiments of this disclosure.

Embodiments of this disclosure are described in more detail in the following with reference to the accompanying drawings. Although some embodiments of this disclosure are illustrated in the accompanying drawings, it may be understood that this disclosure may be implemented in various forms and should not be construed as being limited to embodiments described herein. On the contrary, the embodiments are provided for a more thorough and complete understanding of this disclosure. It may be understood that the accompanying drawings and embodiments of this disclosure are merely used as examples, but are not intended to limit the protection scope of this disclosure.

In descriptions of embodiments of this disclosure, the term "include" and similar terms thereof should be understood as open inclusion, that is, "include but not limited to". The term "based on" should be understood as "at least partially based on". The term "an embodiment" or "the embodiment" should be understood as "at least one embodiment". The terms "first", "second", and the like may represent different objects or a same object. The term "and/or" represents at least one of two items associated with the term. For example, "A and/or B" indicates A, B, or A and B. Other explicit and implicit definitions may also be included below.

It may be understood that, in the technical solutions provided in embodiments of this application, some repeated parts may not be described again in the following descriptions of specific embodiments, and it should be considered that these specific embodiments are mutually referenced and may be combined.

Safety performance of a chip used in a transportation vehicle is particularly important. The ISO 26262 standard defines four safety levels (Automotive Safety Integrity Levels, ASILs): level A, level B, level C, and level D. The ASIL-D is the highest level and represents the strictest safety requirement. In some conventional solutions, a dual-chip redundancy design is used to improve safety. Various functional circuits, for example, a processor, a memory, a buffer, an artificial intelligence vector (AIV) circuit, an artificial intelligence core (AIC) circuit, and an interface circuit, are usually integrated on each chip. A quantity of functional circuits of each type may be one or more. These functional circuits are separately coupled to a plurality of cross station (CS) circuits located on a bus, and the plurality of CS circuits may be interconnected through the bus. Because frequencies of circuits on the bus are not the same, the CS circuits on the bus receive and transmit data in a buffering manner based on the frequencies. For example, the CS circuit may receive, from the bus, data transmitted through the bus, and transmit, in the buffering manner, the data to a functional circuit connected to the CS circuit. Alternatively, the CS circuit may transmit, in the buffering manner, data from a functional circuit to another functional circuit on the bus. When the CS circuit is not directly coupled to a source circuit and a destination circuit, the CS circuit may relay and transmit data on the bus in the buffering manner. The CS circuit enables each functional circuit to transfer instructions and data to each other through the bus. In an architecture in which the dual-chip redundancy design is used, each chip is required to have a configuration basically the same to achieve a same redundancy function. In addition, each chip usually has a main bus and an auxiliary bus of the same type, for example, a mesh bus, to ensure safety of data transmitted between circuits inside each chip, for example, to ensure that when data is transmitted inside the chip, the data is not lost or an error does not occur in the data. Therefore, in some conventional solutions, a dual-chip architecture having four buses of the same type is actually available to ensure safety.

A conventional bus type is a ring bus, and each CS circuit on the ring bus may be coupled to two functional circuits. When a quantity of functional circuits on the conventional ring bus are relatively few, the ring bus has a low delay and has fast and efficient data transmission. However, when a quantity of functional circuits in a chip system increases, causing a quantity of CS circuits to increase, a transmission delay between functional circuits increases. In addition, because bearer bandwidth of the ring bus is limited, when a large amount of data needs to be transmitted between functional circuits, service congestion and bandwidth limitation of the ring circuit are caused.

Another conventional bus type is a mesh bus, and each CS circuit on the mesh bus may be coupled to four functional circuits. The mesh bus is a two-dimensional bus network including a plurality of horizontal ring buses and a plurality of vertical ring buses that cross each other. The mesh bus has high scalability, and functional circuits on the mesh bus may have large bandwidth and a low delay. However, when all functional circuits are coupled to the mesh bus through the CS circuit, a structure of the mesh bus becomes more complex. Consequently, larger resource consumption and a large delay are caused. In addition, the dual-chip redundancy design often used in a conventional design may cause higher costs and resource consumption.

In some embodiments of this disclosure, since functional circuits are respectively coupled to a first bus, such as a mesh bus, and a second bus, such as a ring bus, on a single chip based on function types (for example, sensing and decision-making), perception data may be transmitted on the first bus, and decision data may be transmitted on the second bus. In this way, advantages of each bus may be effectively utilized, such as a low delay and efficient data transmission of the ring bus, and high scalability, high bandwidth, and a low delay of the mesh bus, so that resource consumption and a delay are reduced. In addition, since different types of perception data such as camera data and LiDAR data are fused, validity of the perception data can be verified, a sensed correct environment object is ensured, and a corresponding decision or control signal is generated, so that an execution apparatus such as an actuator of a transportation vehicle can perform a corresponding correct operation. In this way, a safety level of the transportation vehicle may be increased, for example, increased to the ASIL-D level.

FIG. 1 is a schematic diagram of an environment according to some embodiments of this disclosure. In the schematic diagram of the environment, a transportation vehicle 100 includes an electronic device 20. In an embodiment, the transportation vehicle 100 is, for example, an automobile. Alternatively, the transportation vehicle 100 may be another transportation vehicle, for example, a motorcycle, an in-air transportation vehicle, or an on-water transportation vehicle. The transportation vehicle 100 further includes other components, for example, various sensors and execution apparatuses. The various sensors and execution apparatuses may be electrically coupled to the electronic device 20. The sensors may include, for example, a camera, a LiDAR, a sonar, a radar, a temperature sensor, and a humidity sensor, to sense environment data, and transmit the sensed data to a chip in the electronic device 20. The chip in the electronic device 20 performs analysis, computing (compute), and processing based on various received data, and generates a decision signal or a control signal, for example, a transportation vehicle start signal, a braking signal, a steering signal, and an air conditioner turn-on signal. The execution apparatuses such as an actuator, a brake, and a vehicle-mounted air conditioner may receive a decision signal or a control signal from the chip in the electronic device 20, to perform various operations respectively, such as starting, braking, steering, and turning on the air conditioner.

Figure 2:
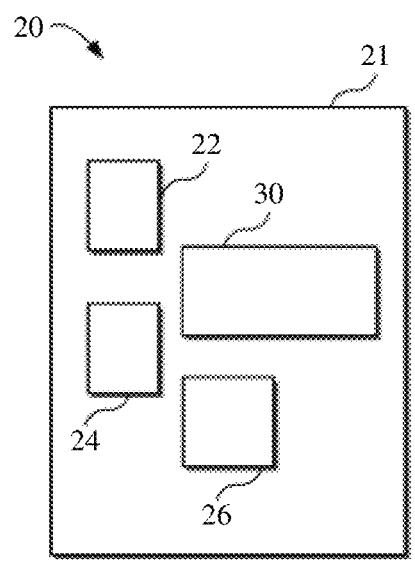
FIG. 2 is a schematic block diagram of an electronic device according to some embodiments of this disclosure.

FIG. 2 is a schematic block diagram of an electronic device 20 according to some embodiments of this disclosure. The electronic device 20 includes a circuit board 21 and a plurality of electronic components mounted on the circuit board. The circuit board 21 includes at least one of a printed circuit board (PCB) and a flexible circuit board (FPC). The plurality of electronic components include a communication chip 22, a matching circuit 24, a power management chip 26, and a chip 30. The communication chip 22 is configured to communicate with an external device or another electronic apparatus. The matching circuit 24 is configured to perform matching on each electronic component. The power management chip 26 may be coupled to, for example, a power supply to manage received power and distribute the power to each electronic component. The chip 30 is configured to receive sensed data of the foregoing sensor to generate perception data, and generate a control signal based on the perception data. The sensed data indicates native data detected by the sensor, where the native data indicates an environment condition. The perception data indicates processed data that indicates or describes the environment condition after the sensed data is processed. For example, native image or video data photographed by a camera is sensed data. However, when an image or a video is processed and an AI algorithm is used to identify and determine that there is a pedestrian in the photographed image or video, data that represents or describes this is perception data. Although four electronic components are shown in FIG. 2, it may be understood that the electronic device 20 may include more or fewer electronic components. This is not limited in this disclosure.

FIG. 3 is a schematic diagram of a chip 30 according to some embodiments of this disclosure. In an embodiment, the chip 30 includes a first bus M1, a second bus R1, and a third bus R2. The chip 30 further includes a plurality of first CS circuits on the first bus M1, a plurality of second CS circuits on the second bus R1, and a plurality of third CS circuits on the third bus R2. The chip 30 further includes a bridge circuit B1 coupled between the first bus M1 and the second bus R1, and a bridge circuit B2 coupled between the first bus M1 and the third bus R2. The chip 30 further includes a first node circuit 371, a second node circuit 372, and another circuit that is not shown. Although FIG. 3 shows a specific configuration manner of the chip 30, it may be understood that the chip 30 may include more or fewer circuits. This is not limited in this disclosure. In addition, although different buses are coupled through a bridge circuit, this is not limited in this disclosure. Another manner of coupling different buses is possible. For example, some functional circuits such as a memory are used as coupled circuits. Perception data on the first bus M1 is stored in the memory, and a processor on the second bus R1 obtains the perception data from the memory.

In an embodiment, for example, the first bus M1 is a mesh bus. In FIG. 3, for example, the first bus M1 includes three horizontal ring buses and four vertical ring buses that cross each other, and one CS circuit is disposed at each cross point. For example, CS circuits 311, 312, 313, and 314 are disposed at cross points of the first horizontal ring bus and the four vertical ring buses, and CS circuits 311, 321, and 331 are disposed at cross points of the first vertical ring bus and the three horizontal ring buses. Although a specific mesh bus configuration in 3×4 is shown in FIG. 3, this is merely an example and is not intended to limit the scope of this disclosure. A quantity of horizontal buses and a quantity of vertical buses may be more or fewer, and the quantity of horizontal buses and the quantity of vertical buses may be the same or different. Alternatively, the first bus M1 may be another type of bus, for example, a full-mesh bus.

Each CS circuit on the first bus M1 is basically the same. Therefore, only a single CS circuit is described in the following. It may be understood that descriptions of the single CS circuit may be applied to another CS circuit on the first bus M1. When the first bus M1 is the mesh bus, each CS circuit may be coupled to four node circuits. The node circuits represent different functional circuits that may be coupled to CS circuits on the bus, such as an AIC circuit, an AIV circuit, an interface circuit, and a buffer. The node circuit is not limited in this disclosure. Some external electronic apparatuses, such as a LiDAR, a camera, and a sonar, may be coupled to the CS circuit through the interface circuit. In the case of the mesh circuit, because a plurality of communication lines are provided between nodes, during an operation, a shortest communication path available may be selected based on a requirement for data transmission on the mesh bus. This reduces transmission time and improves efficiency. Although the functional circuits are coupled to the bus through the CS circuit, this is not limited in this disclosure. Another manner of coupling the functional circuits to the bus is possible.

The transportation vehicle 100 usually has a plurality of environment condition sensors to sense environment conditions around the transportation vehicle from a plurality of dimensions. For example, the transportation vehicle 100 may have 12 cameras, four LiDARs, 12 radars, and four sonars. In one embodiment, the interface circuits respectively corresponding to the plurality of sensors may be respectively coupled to the CS circuits on the mesh circuit. The chip 30 may have a plurality of processing circuits such as the AIV circuit and/or the AIC circuit that are respectively coupled to the plurality of CS circuits on the first bus M1. In this way, in comparison with the ring bus, congestion and limited bandwidth that may be easily caused when the ring bus is connected to a plurality of circuits can be prevented.

Real-time sensed data may be stored in a memory, and then be read from the memory by the processing circuit such as the AIV circuit and/or the AIC circuit for preliminary processing, to generate perception data that indicates an environment condition. A plurality of processing circuits are used to perform parallel preprocessing on the sensed data to generate the perception data that indicates the environment condition, so that all sensed data can be prevented from being stacked in a back-end processor for processing. This reduces a performance requirement on the processor and reduces a quantity of processing operations of the processor. In an embodiment, a corresponding memory and processing circuit may be disposed on a CS circuit coupled to an interface circuit corresponding to a sensor or an adjacent CS circuit, so that sensed data from the sensor may be transferred to the processing circuit through a short transmission path. In this way, in comparison with the case in which a plurality of sensor interfaces and a plurality of processing circuits are coupled to the CS circuit on the ring bus, time consumed for transmission and processing is reduced, and bus network congestion is reduced. Alternatively, the sensed data may be directly provided for the processing circuit.

In the embodiment of FIG. 3, the first bus M1 transmits first perception data. For example, a camera coupled to a first CS circuit 311 on the first bus M1 transmits photographed sensed data to a first processing circuit coupled to a second CS circuit 312 on the first bus M1. Alternatively, a first processing circuit may be coupled to another CS circuit. After processing image or video data, the first processing circuit generates the first perception data, transmits the first perception data to the CS circuit 333 through the first bus M1, and then transmits the first perception data to the second bus R1 through the bridge circuit B1. In addition, other perception data, for example, sonar perception data corresponding to sonar sensed data from a sonar sensor, may also be transmitted to the second bus R1 through the first bus M1 and the bridge circuit B1.

In an embodiment, a type of the second bus R1 and a type of the first bus M1 are different. For example, the second bus R1 is a ring bus. A node is not limited in this disclosure. Some external electronic apparatuses, such as a radar, may be coupled to the CS circuit on the second bus R1 through an interface circuit. Alternatively, the second bus R1 may be a star or linear bus.

The second bus R1 has a plurality of CS stations, and each CS station may be coupled to two node circuits. The node represents a different functional circuit that may be coupled to a CS circuit on a bus, such as the processor or the interface circuit. As shown in FIG. 3, a second CS circuit 35 on the second bus R1 is coupled to the first node circuit 371 and the second node circuit 372. In an embodiment, the first node circuit 371 is the processor, and the second node circuit 372 is the interface circuit. In an embodiment, the second bus R1 may have more or fewer CS circuits than the five CS circuits shown in FIG. 3. The second bus R1 receives, from the first bus M1 through the bridge circuit B1, the first perception data, for example, image or video perception data that indicates an environment condition and that is obtained based on image or video sensed data photographed by a camera, and transmits the first perception data to a node circuit, for example, a memory, coupled to the CS circuit on the second bus R1. Another node circuit, for example, a processor, coupled to the CS circuit on the second bus R1 may obtain the perception data from the memory and process the perception data to generate a control instruction for controlling an execution apparatus. Alternatively, the perception data may be directly transmitted to the processor without passing through the memory.

In addition, perception data of another type may also be transmitted through the second bus R1. For example, a sonar coupled to a CS circuit on the first bus M1 may transmit sonar sensed data to a processing circuit coupled to the first bus M1, and the processing circuit generates sonar perception data after processing the sensed data. The sonar perception data is transmitted, through the bridge circuit B1, to the processor coupled to the second bus R1. In another embodiment, a radar coupled to the second bus R1 may transmit the sensed data to the second bus R1 through the interface circuit, and the processing circuit coupled to the second bus R1 generates radar perception data after processing the sensed data. The radar perception data is transmitted, through the second bus R1, to the processor coupled to the second bus R1. This disclosure does not limit a source of second perception data transmitted on the second bus R1. The second perception data may be from a sensor coupled to the first bus M1 or from a sensor coupled to the second bus R1.

After receiving the image or video perception data and the sonar perception data, the processor coupled to the second bus R1 may generate, based on different types of perception data, the control instruction for controlling the execution apparatus. For example, if the image or video perception data indicates that there is a pedestrian in the center of environment ahead, and the sonar perception data also indicates that there is a pedestrian in the center of the environment ahead, the processor may correspondingly generate a braking instruction, so that a braking apparatus of the transportation vehicle 100 brakes for emergency to prevent collision with the pedestrian. Since different types of perception data are fused, for example, mutual verification is performed, validity of the perception data can be ensured and safety of a transportation vehicle can be improved. In addition, because different types of perception data are used to perform data fusing, redundancy configuration (for example, cameras, sonars, or radars are multiplied) on a hardware apparatus is not necessary. This reduces hardware matching costs. Alternatively, the processor may use various types of other perception data to comprehensively determine an environment condition and generate a corresponding control instruction. For example, the processor may generate, through fusing of image or video perception data and radar sensed data, or fusing of sonar perception data and radar perception data, the control instruction for controlling the execution apparatus. Alternatively, more types of perception data, for example, the foregoing three types of perception data, may be used to perform data fusing, to further improve accuracy of environment perception. This improves decision correctness and safety.

In the embodiment of FIG. 3, a circuit for decision-making only, such as the processor, is disposed to be coupled to a ring bus through a CS circuit. This reduces resource consumption and a transmission delay. Alternatively, based on bus service load or a performance optimization requirement, some sensors, such as the radar, may be coupled to the CS circuit on the second bus R1 through the interface circuit. If a quantity of such sensors is small, disposing a small quantity of sensors on the ring bus does not cause traffic congestion on the ring circuit. In addition, because the sensors are disposed at a node adjacent to the processor, the transmission delay may be further reduced, and a corresponding quick response is provided. For example, a radar sensor is usually configured to detect an environment condition near (for example, within a few meters or one meter from) a transportation vehicle. The radar sensor is disposed on a same loop closer to the decision-making processor, so that the radar sensor can quickly make a response, and collision with a transportation vehicle can be prevented.

In some embodiments, because the first bus M1 and the second bus R1 may work in an asynchronous clock, and data bit widths are different (for example, a bit width of data transmitted on the first bus M1 is 1024 bits, and a bit width of data transmitted on the second bus R1 is 256 bits), the bridge circuit B1 is configured to perform asynchronous processing and perform splicing and splitting processing on a data packet.

In some other embodiments, the chip 30 may further include the third bus R2. A configuration of the third bus R2 is basically the same as or similar to a configuration of the second bus R1. Therefore, the foregoing aspects of the second bus R1 are applicable to the third bus R2. For example, a type of the third bus R2 and a type of the second bus R1 are the same. For example, both the third bus R2 and the second bus R1 are ring buses. The third bus R2 may be a copy bus of the second bus R1. As shown in FIG. 3, the first node circuit 371 and the second node circuit 372 are also coupled to a CS circuit on the third bus R2. The third bus R2 is coupled to the first bus M1 through the second bridge circuit B2. Safety of the chip 30 may be further improved through disposing of the copy bus, for example, to satisfy a requirement of the ASIL-D.

In a process of transmitting perception data from a sending apparatus (for example, the AIV circuit or the AIC circuit) on the first bus M1 to a receiving apparatus (for example, the processor) on the second bus R1, the perception data may be lost or an error may occur in the perception data. The foregoing problem can be overcome to some extent since different types of data are fused, so that the processor can still make a correct decision. To further provide safety of the transportation vehicle, in an embodiment, an auxiliary bus or a copy bus, for example, the third bus R2, is disposed. The perception data sent by the sending apparatus on the first bus M1 may be sent through different paths. The perception data reaches the first node 371 such as the processor through the bridge circuit B1 and the second bus R1. Auxiliary data reaches the first node 371 through the bridge circuit B2 and the third bus R2. The received perception data and auxiliary data can be verified on the processor through two different transmission paths, to ensure that the received perception data is valid, as further detailed below with respect to FIG. 6 and FIG. 7.

Figure 4:
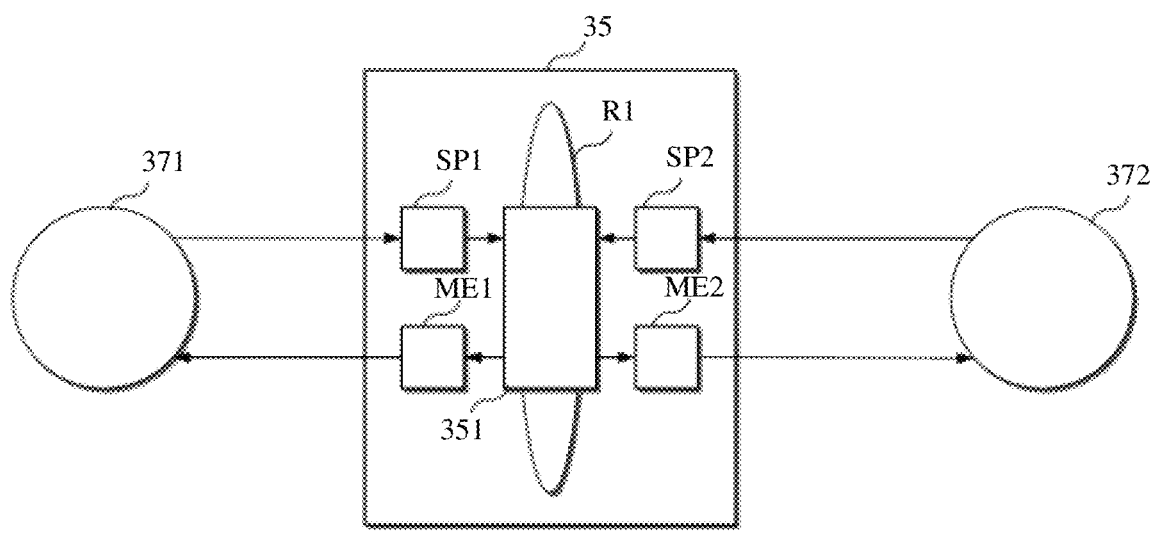
FIG. 4 is a schematic diagram of a ring bus cross station according to some embodiments of this disclosure.

FIG. 4 is a schematic diagram of a CS circuit 35 on a ring bus according to some embodiments of this disclosure. It may be understood that another CS circuit on the second bus R1 has a same configuration as the CS circuit 35. Therefore, only the CS circuit 35 is used as an example for description herein. The CS circuit 35 may be coupled to two node circuits, for example, a first node circuit 371 and a second node circuit 372. The CS circuit 35 includes a buffering circuit 351, an upload ring buffer SP1, an upload ring buffer SP2, a download ring buffer ME1, and a download ring buffer ME2. The upload ring buffer is configured to buffer a to-be-transmitted data packet, and the download ring buffer is configured to buffer a data packet received from a bus. The buffering circuit 351 is configured to route and transmit a command and data.

FIG. 5 is a schematic diagram of a mesh bus CS circuit 311 according to some embodiments of this disclosure. It may be understood that another CS circuit on the first bus M1 has a same configuration as the CS circuit 311. Therefore, only the CS circuit 311 is used as an example for description herein. The CS circuit 311 may be coupled to four node circuits N1, N2, N3, and N4. The CS circuit 311 includes four buffering circuits P1, P2, P3, and P4, four upload ring buffers SP1, SP2, SP3, and SP4, four download ring buffers ME1, ME2, ME3, and ME4, and four ring-exchange buffers TR1, TR2, TR3, and TR4. The buffering circuit is configured on a ring bus to upload, download, or relay data in a buffering manner based on a frequency. The upload ring buffer is configured to buffer a data packet to be transmitted to a horizontal ring bus. The download ring buffer is configured to buffer a data packet received from a vertical ring bus. The ring-exchange buffer is configured to buffer a data packet transmitted from the horizontal ring bus to the vertical ring bus. The buffering circuit is configured to route and transmit a command and data.

Figure 6:
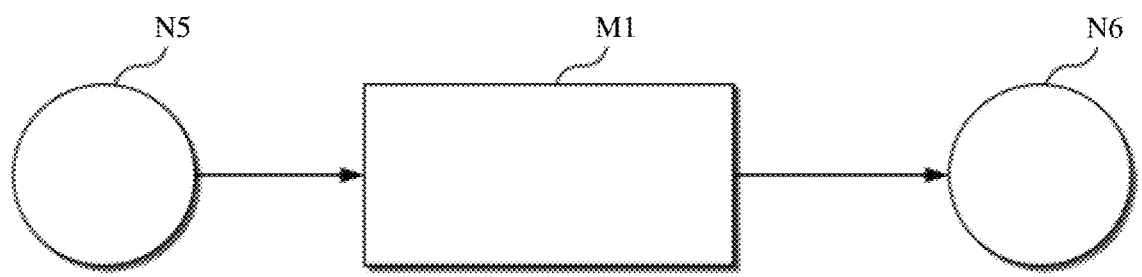
FIG. 6 is a schematic diagram of data transmission through a mesh bus according to some embodiments of this disclosure.

FIG. 6 is a schematic diagram of data transmission through a mesh bus according to some embodiments of this disclosure. Data is transmitted from a node circuit N5 to a node circuit N6 through the first bus M1. In an embodiment, the node circuit N5 is, for example, an interface circuit coupled to a camera, and the node circuit N6 is, for example, a memory. The node circuit N5 and the node circuit N6 may alternatively be other components, such as an AIV circuit and an AIC circuit. Both the node circuit N5 and the node circuit N6 are coupled to the first bus M1 through the CS circuit. Therefore, the data is transmitted on the first bus M1. In an embodiment, the transmitted data includes control data, payload data, and check data that is for checking the payload data, for example, cyclic redundancy check (CRC) data. The check data is used to check whether the payload data is complete and valid. The data transmission on the first bus M1 can basically reach a safety level of the ASIL-B through data checking. Different types of ASIL-B level perception data are further fused on the second bus R1, so that a safety level of the ASIL-D may be further achieved.

Figure 7:
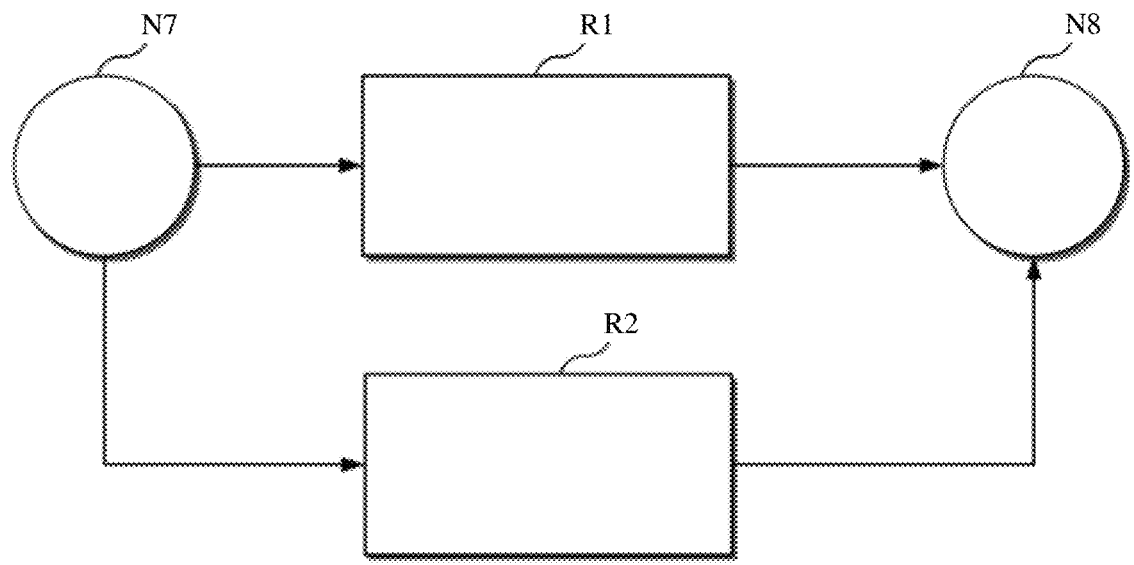
FIG. 7 is a schematic diagram of data transmission through a ring bus according to some embodiments of this disclosure.

FIG. 7 is a schematic diagram of data transmission through a ring bus according to some embodiments of this disclosure. Data is transmitted from a node circuit N7 to a node circuit N8 through the second bus R1. In an embodiment, the node circuit N7 is, for example, a memory, and the node circuit N8 is, for example, a processor. The memory stores at least one of first perception data and second perception data, and the memory further stores at least one of first auxiliary data and second auxiliary data. For example, the first perception data is transmitted from a processing circuit on the first bus M1 to a memory on the second bus R1 through the first bus M1, the bridge circuit B1, and the second bus R1. For example, the first auxiliary data is transmitted from the processing circuit on the first bus M1 to a memory on the third bus R1 through the first bus M1, the bridge circuit B2, and the third bus R2. The memory is located on both the second bus R1 and the third bus R2. The first auxiliary data is, for example, CRC data for the first perception data. Alternatively, the first auxiliary data may be copy perception data that is the same as the first perception data, or other check data. The auxiliary data may be used to verify integrity or validity of the corresponding perception data to obtain valid environment data, or combined with the perception data to form valid environment data. The environment data is data that describes an environment condition inside or around a transportation vehicle in which a chip is located. The environment condition includes, for example, a lane condition, a surrounding building condition, a weather condition, an in-vehicle temperature, a motion condition of a nearby pedestrian, and the like. The processor may further obtain other data, for example, control data, from the memory through the second bus R1. This is not limited in this disclosure.

Similarly, for example, the second perception data is transmitted from the processing circuit on the first bus M1 to the memory on the second bus R1 through the first bus M1, the bridge circuit B1, and the second bus R1. For example, the second auxiliary data is transmitted from the processing circuit on the first bus M1 to the memory on the third bus R2 through the first bus M1, the bridge circuit B2, and the third bus R2. Alternatively, for example, the second perception data may be transmitted from another processing circuit on the second bus R1 to the memory on the second bus R1. For example, the second auxiliary data is transmitted from another processing circuit on the third bus R2 to the memory on the third bus R2. The another processor circuit is located on both the second bus R1 and the third bus R2. The processor may further obtain other data, for example, a copy of control data, from the memory through the third bus R2. This is not limited in this disclosure.

The processor may then determine, based on the first perception data and the first auxiliary data, first environment data that indicates the environment condition. For example, the processor uses CRC data to verify whether the first perception data is complete and valid. If the first perception data is complete and valid, the first perception data may be used as the first environment data that indicates the environment condition. For example, the first environment data may indicate that there is a pedestrian at a specific distance or may indicate content of a traffic sign in front of a transportation vehicle. Similarly, the processor may determine, based on the second perception data and the second auxiliary data, second environment data that indicates the environment condition. Transmission paths of the second perception data and the second auxiliary data may be respectively similar to transmission paths of the first perception data and the first auxiliary data. Details are not described herein again.

A type of the second perception data and a type of the first perception data are different. For example, the first perception data may be image or video data from a camera, and the second perception data may be data measured from a LiDAR. The processor may then fuse different types of perception data and determine the environment condition. For example, when both the first perception data and the second perception data indicate that there is a pedestrian in the center of a road ahead, the processor may generate, based on the first perception data and the second perception data, fused data, and generate, based on the fused data, a control signal for controlling an execution apparatus, for example, for controlling a braking apparatus to brake in emergency. In addition, the processor may further enable, based on the fused data, a vehicle-mounted display screen to display the pedestrian on the road ahead. Alternatively, the processor may directly generate, based on the first perception data and the second perception data, the control signal for controlling the execution apparatus.

After generating the control signal, the processor also separately transmits, through the second bus R1 and the third bus R2, the control signal to an interface circuit coupled to the execution apparatus. The interface circuit is also coupled to the second bus R1 and the third bus R2 as a node circuit. Alternatively, the processor may transmit the control signal to the execution apparatus through a dedicated connection line. Data used for decision-making is separately transmitted to the processor through the second bus R1 and the third bus R2, so that the processor can ensure integrity and validity of received perception data, thereby further improving correctness of a decision made by an intelligent chip of the transportation vehicle, and correspondingly improving safety performance of the transportation vehicle. For example, the chip 30 can reach a safety level of the ASIL-D as a whole since data of different types is fused and perception data and a control signal are transmitted through different second buses and third buses.

Figure 8:
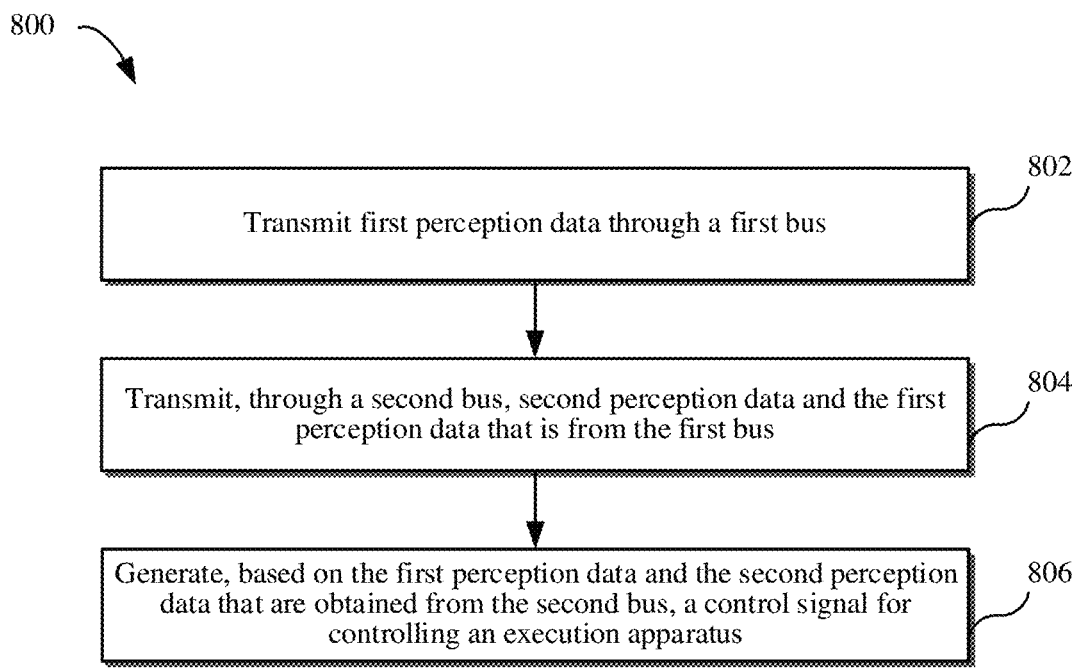
FIG. 8 is a schematic flowchart of a method for generating a control signal according to some embodiments of this disclosure.

FIG. 8 is a schematic flowchart of a method 800 for generating a control signal according to some embodiments of this disclosure. The method 800 may be performed by the chip 30 described above. Therefore, the foregoing aspects described for the chip 30 may be applied to the method 800. Details are not described herein again. Step 802: Transmit first perception data through a first bus. The first bus is, for example, a mesh bus, and the first perception data is, for example, camera data. An interface circuit coupled to the first bus receives original image or video data from a camera. The original image or video data is transmitted, for example, to a processing circuit on the first bus through the first bus, for example, an AIV circuit or an AIC circuit. The processing circuit obtains the first perception data after processing the original image or video data. The first perception data is transmitted to a second bus through the first bus and a bridge circuit.

Step 804: Transmit, through the second bus, second perception data and the first perception data that is from the first bus, where a type of the second bus and a type of the first bus are different, and a type of the second perception data and a type of the first perception data are different. The second bus is, for example, a ring bus, and the second perception data is, for example, LiDAR data. A LiDAR may be coupled to the first bus or the second bus through the interface circuit. When the LiDAR is coupled to the first bus, processing and transmission manners of the LiDAR data are similar to those of the camera data. Details are not described herein again. When the LiDAR is coupled to the second bus, the LiDAR transmits original LiDAR data to a processing circuit, such as an AIV circuit or an AIC circuit, through the second bus, to generate the second perception data. The second perception data is transmitted to the processor on the second bus through the second bus. Step 806: Generate, based on the first perception data and the second perception data that are obtained from the second bus, a control signal for controlling an execution apparatus. For example, the processor may generate the control signal based on the first perception data and the second perception data in the manner described above. For example, the processor may fuse the first perception data and the second perception data, to generate the control signal. In an embodiment, the processor may further determine first environment data based on the first perception data and the first auxiliary data, determine second environment data based on the second perception data and the second auxiliary data, then fuse the first environment data and the second environment data to determine an environment condition, and generate a corresponding control signal based on the determined environment condition. Alternatively, the processor may directly determine the control signal based on the first environment data and the second environment data.

Although the present subject matter has been described in a language specific to structural features and/or methodlogical actions, it may be understood that the subject matter defined in the appended claims is not necessarily limited to the specific features or actions described above. Instead, the specific features and actions described above are merely example forms to implement the claims.

What is claimed is:

1. A chip, comprising:
a first bus configured to transmit first perception data;
a second bus coupled to the first bus, wherein a type of the second bus and a type of the first bus are different, the second bus is configured to transmit second perception data and the first perception data from the first bus, and a type of the second perception data and a type of the first perception data are different; and
a processor coupled to the second bus, wherein the processor is configured to generate, based on the first perception data and the second perception data, a control signal that controls an execution apparatus.

2. The chip according to claim 1, further comprising:
a third bus coupled to the first bus, wherein a type of the third bus and the type of the second bus are the same, and the third bus is configured to transmit first auxiliary data corresponding to the first perception data from the first bus and second auxiliary data corresponding to the second perception data, wherein
the processor is coupled to the third bus, and the control signal is generated, by the processor, based on the first perception data, the first auxiliary data, the second perception data, and the second auxiliary data.

3. The chip according to claim 2, wherein the processor is further configured to:
determine, based on the first perception data and the first auxiliary data, first environment data indicating an environment condition; and
determine, based on the second perception data and the second auxiliary data, second environment data indicating the environment condition, wherein the control signal is generated, by the processor, based on the first environment data and the second environment data.

4. The chip according to claim 3, wherein the processor is further configured to:
fuse the first environment data and the second environment data to generate fused data, wherein the control signal is generated, by the processor, based on the fused data.

5. The chip according to claim 1, wherein the processor is further configured to:
fuse the first perception data and the second perception data to generate fused data, wherein the control signal is generated, by the processor, based on the fused data.

6. The chip according to claim 1, further comprising:
a first cross station circuit located on the first bus and configured to transmit data; and
a first processing circuit coupled to the first cross station circuit and configured to generate the first perception data based on first sensed data from a first sensor, wherein the first sensor is coupled to the first cross station circuit.

7. The chip according to claim 1, further comprising:
a second cross station circuit located on the second bus and configured to transmit data; and
a second processing circuit coupled to the second cross station circuit and configured to generate the second perception data based on second sensed data from a second sensor, wherein the second sensor is coupled to the second cross station circuit.

8. The chip according to claim 1, wherein the first bus comprises a mesh bus, and the second bus comprises a ring bus.

9. An electronic device, comprising:
a circuit board; and
the chip according to claim 1, wherein the chip is mounted on the circuit board.

10. A transportation vehicle, comprising:
a power supply;
a circuit board; and
a chip, comprising:
a first bus configured to transmit first perception data;
a second bus coupled to the first bus, wherein a type of the second bus and a type of the first bus are different, the second bus is configured to transmit second perception data and the first perception data from the first bus, and a type of the second perception data and a type of the first perception data are different; and
a processor coupled to the second bus, wherein the processor is configured to generate, based on the first perception data and the second perception data, a control signal that controls an execution apparatus, wherein the chip and the circuit board are powered by the power supply.

11. The transportation vehicle according to claim 10, further comprising:
a first sensor, coupled to the first bus through a first interface, and configured to generate first sensor data and transmit the first sensor data to the first bus; and
a second sensor, coupled to the second bus through a second interface, and configured to generate second sensor data and transmit the second sensor data to the second bus.

12. The transportation vehicle according to claim 10, wherein the chip further comprises:
a third bus coupled to the first bus, wherein a type of the third bus and the type of the second bus are the same, and the third bus is configured to transmit first auxiliary data corresponding to the first perception data from the first bus and second auxiliary data corresponding to the second perception data, wherein
the processor is coupled to the third bus, and the control signal is generated, by the processor, based on the first perception data, the first auxiliary data, the second perception data, and the second auxiliary data.

13. The transportation vehicle according to claim 12, wherein the processor is further configured to:
determine, based on the first perception data and the first auxiliary data, first environment data indicating an environment condition; and
determine, based on the second perception data and the second auxiliary data, second environment data indicating the environment condition, wherein the control signal is generated, by the processor, based on the first environment data and the second environment data.

14. The transportation vehicle according to claim 13, wherein the processor is further configured to:
fuse the first environment data and the second environment data to generate fused data, wherein the control signal is generated, by the processor, based on the fused data.

15. The transportation vehicle according to claim 10, wherein the processor is further configured to: fuse the first perception data and the second perception data to generate fused data, wherein the control signal is generated, by the processor, based on the fused data.

16. A method for generating a control signal, comprising:
   transmitting, through a first bus, first perception data;
   transmitting, through a second bus, second perception data and the first perception data from the first bus, wherein a type of the second bus and a type of the first bus are different, and a type of the second perception data and a type of the first perception data are different; and
   generating, based on the first perception data and the second perception data that are obtained from the second bus, a control signal that controls an execution apparatus.

17. The method according to claim 16, further comprising:
   transmitting, through a third bus, first auxiliary data that is corresponding to the first perception data from the first bus and second auxiliary data corresponding to the second perception data, wherein the third bus is coupled to the first bus, and a type of the third bus and the type of the second bus are the same, wherein the control signal is generated based on the first perception data, the first auxiliary data, the second perception data, and the second auxiliary data.

18. The method according to claim 17, wherein generating, based on the first perception data and the second perception data that are obtained from the second bus, the control signal that controls the execution apparatus comprises:
   determining, based on the first perception data and the first auxiliary data, first environment data indicating an environment condition;
   determining, based on the second perception data and the second auxiliary data, second environment data indicating the environment condition; and
   generating the control signal based on the first environment data and the second environment data.

19. The method according to claim 18, wherein generating the control signal based on the first environment data and the second environment data comprises:
   fusing the first environment data and the second environment data to generate fused data; and
   generating the control signal based on the fused data.

* * * * *